United States Patent
Enshaee et al.

(10) Patent No.: US 10,042,381 B2
(45) Date of Patent: Aug. 7, 2018

(54) DOUBLE WIRELESS RECEIPT AND TRANSMISSION WITH MECHANICAL MOVEMENT CAUSING SECOND WIRELESS TRANSMISSION

(71) Applicant: Open Up LLC, Wood-Ridge, NJ (US)

(72) Inventors: Arash Harry Enshaee, Wood-Ridge, NJ (US); David Nazar, Paramus, NJ (US); Hamidreza Akhavan Farahani, Rutherford, NJ (US)

( * ) Notice: Subject to any disclaimer, the term of this patent is extended or adjusted under 35 U.S.C. 154(b) by 254 days.

(21) Appl. No.: 14/822,084

(22) Filed: Aug. 10, 2015

(65) Prior Publication Data
US 2017/0045906 A1    Feb. 16, 2017

(51) Int. Cl.
*G05G 1/02* (2006.01)
*G05B 15/02* (2006.01)
*H04W 4/80* (2018.01)

(52) U.S. Cl.
CPC .............. *G05G 1/02* (2013.01); *G05B 15/02* (2013.01); *H04W 4/80* (2018.02)

(58) Field of Classification Search
CPC ............ G05G 1/02; G05B 15/02; H04W 4/80
See application file for complete search history.

(56) References Cited

U.S. PATENT DOCUMENTS

| | | | |
|---|---|---|---|
| 4,670,746 A | 6/1987 | Taniguchi et al. | |
| 4,788,542 A | 11/1988 | Tanabe | |
| 4,942,393 A | 7/1990 | Waraksa et al. | |
| 5,903,226 A | 5/1999 | Suman et al. | |
| 5,942,985 A | 8/1999 | Chin | |
| 8,405,606 B2 | 3/2013 | Auguste et al. | |
| 2002/0152828 A1* | 10/2002 | Nagasaka | B60K 37/06 74/473.3 |
| 2006/0038656 A1* | 2/2006 | Wilson | G07C 9/00182 340/5.61 |
| 2007/0082181 A1* | 4/2007 | Jung | B32B 3/085 428/182 |
| 2007/0096938 A1* | 5/2007 | Lopez | G08C 17/02 340/12.22 |
| 2009/0237206 A1* | 9/2009 | Anderson | B60R 25/23 340/5.72 |
| 2013/0181822 A1* | 7/2013 | Leavitt | G08C 17/02 340/12.28 |

OTHER PUBLICATIONS

Mike Szczys, Remotely control your crappy car (dangerously), Nov. 10, 2009, hackaday.com.

* cited by examiner

*Primary Examiner* — Mohammad Ali
*Assistant Examiner* — Vincent Chang
(74) *Attorney, Agent, or Firm* — Michael J. Feigin, Esq.; Feigin and Fridman

(57) ABSTRACT

A mechanical or lockable device is operated based on the use of wireless transmission (electrical data connection or mechanical tapping) to a key housing. The key housing converts the transmission (a first transmission) into a code and checks if the code is correct. If so, a mechanical press of a button on a key fixedly held in place in the housing is made. The key is a further wireless transmitter which transmits, via a second transmission, a code to move a mechanical object, such as a latch in a car door lock or a garage door. In this manner, two wireless transmissions are made to two different receivers, causing two different mechanical movements, in sequence.

13 Claims, 9 Drawing Sheets

DOUBLE WIRELESS RECEIPT AND TRANSMISSION WITH MECHANICAL MOVEMENT CAUSING SECOND WIRELESS TRANSMISSION

This application incorporates by reference U.S. patent application, serial no. is not available, entitled Button Pressing Device with Moving Plate and Sticky Ball having a filing date of Aug. 10, 2015, having the same inventors as the present application.

FIELD OF THE DISCLOSED TECHNOLOGY

The disclosed technology relates generally to button pressing and, more specifically, to pressing buttons by remote control.

BACKGROUND OF THE DISCLOSED TECHNOLOGY

Remote controls are ubiquitous. Such devices transmit a signal wirelessly, using infrared, radio frequency, or otherwise, to a receiver. They are used to activate various receiving devices, including televisions, garage doors, gates, cars, and even window shades, as well as model craft. They work well, but require specialized devices which transmit particular encoded data. The easiest way to operate a receiving device, for a consumer, is simply to use the remote control provided by the manufacturer or retailer.

While programmable devices exist, these too are stand-alone devices which require manual button presses for their operation. Still further, it is not always possible to copy the transmitted signal, as manufacturers may encrypt or distort the transmission in a way that changes each time or requires a particular piece of hardware. Third party remote control is discouraged, difficult, or simply not worth the expense.

The problem is that current remotes are each proprietary in size, shape, and codes transmitted. In order to create a truly universal remote, one would need to be able to transmit infrared, radio frequency (RF), and have buttons which are equally easy to use as remote control, while coding for many different remote controls being used in one interface. There exists a need in the art to be able to operate such remotes from a common interface while retaining functionality, ease of producing the desired transmission, and minimum expense.

SUMMARY OF THE DISCLOSED TECHNOLOGY

Embodiments of the disclosed technology solve the aforementioned problems by using the same key and/or transmission device provided by a manufacturer of a device with movable mechanical parts. Each of these devices used in embodiments of the disclosed technology has a mechanical push button which is pressed (physically moved or on which physical pressure is applied) to operate this transmitter. It is held without a housing (or "key housing") which can then be tapped, vibrated, or communicated with via a second and distinct wireless transmission. In this manner, one can use one's smartphone or other hand-held wireless device to communicate therewith, and send a code which causes a mechanical movement leading to a second wireless transmission. This second wireless transmission then opens/unlocks the car or moves another mechanical object, in the process creating a type of universal remote control which can operate any remote control having an exterior push button.

In a method thereof, one sends an encoded wireless transmission to a housing holding a remote control designed to operate a mechanically moving device. This causes a processor within the housing to decode the encoded wireless transmission wherein, upon the transmission being decoded, a device moves within the housing, causing depression of a button of the remote control. The remote control then transmits a second wireless signal causing the mechanically moving device to move.

In embodiments of the disclosed technology, the remote control is designed to independently (defined as without aid of another device other than that of a press by a human user) control the mechanically moving device by way of a push of the button on the device (remote control), where instead, the housing (or element within it) acts to push the button (directly or by way of pushing a flange or other item into the button). The wireless transmission can be transmission of a password by way of a short range wireless connection between a wireless transmission device and the housing (meaning, devices held within the housing). The wireless transmission can instead, or also, be transmission of a password by way of a packet-switched data network connection. The password/code is transmitted over such a data connection. The wireless transmission can instead be in the form of a physical vibration of the housing decoded by the decoder.

A kit of embodiments of the disclosed technology can include a mechanical locking device and a remote control with mechanical button. The mechanical button is operative to open (the lock of) the mechanical locking device by way of wireless transmission. A housing holding the remote control is also part of the kit, the housing having a motorized movable device there-within. The housing has an input and decoder decoding input, such that, upon input matching a pre-designated pattern (such as a knock sequence or password), the motorized movable device depresses the mechanical button of the remote control, thereby unlocking the mechanical locking device. The kit can further include a hand-held wireless transceiver connecting via radio signal to the input of the housing. Or the input can be a vibration sensor, and the vibrations are translated into coded input decoded by the decoder. The housing can be affixed on an interior side of a window of a vehicle, and the vibrations can be exerted on an exterior side of the window.

A wireless transmission causes a mechanical movement which causes a further wireless transmission for purposes of causing a second mechanical movement in the above or other embodiments of the disclosed technology. A first wireless transmission from a hand-held wireless device having a network connection with a device housing a mechanically movable part is made. The mechanically movable part is then caused to engage a mechanical button of a wireless transmitter, based on the first wireless transmission. This causes the wireless transmitter to send a second wireless transmission, based on the engaging of the mechanical button. Then a second mechanical device, distinct from (having no physical connection or abutment there-with) the wireless transmitter, and the hand-held wireless device is then moved as a result of the first and second wireless transmission, as well as a result of the engaging of the mechanical button. Thus, all this is caused, or configured to be caused, based on the initial transmission by a user.

The mechanically movable part and the mechanical button are physically separated from the wireless transmitter by the second mechanical device, in embodiments of the disclosed technology (such as a garage door or car door/window providing the separation). The first wireless transmission transmits one of a plurality of pre-designated patterns or codes, each operative to cause the mechanically movable part to engage the mechanical button in embodiments of the disclosed technology. The device housing the mechanically movable part is fixed in position with respect to the mechanical button and fixed to an interior of a vehicle, in one embodiment. In such an embodiment, the mechanical button can be on a mechanical key which also operates a mechanical lock of said vehicle.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

A mechanical or lockable device is operated based on use of wireless transmission (electrical data connection or mechanical tapping) to a key housing. The key housing converts the transmission (a first transmission) into a code and checks if the code is correct. If so, a mechanical press of a button on a key fixedly held in place in the housing is made. The key is a further wireless transmitter which transmits, via a second transmission, a code to move a mechanical object, such as a latch in a car door lock or a garage door. In this manner, two wireless transmissions are made to two different receivers causing two different mechanical movements, in sequence.

Embodiments of the disclosed technology will become clearer in view of the following description of the drawings.

Figure 1:
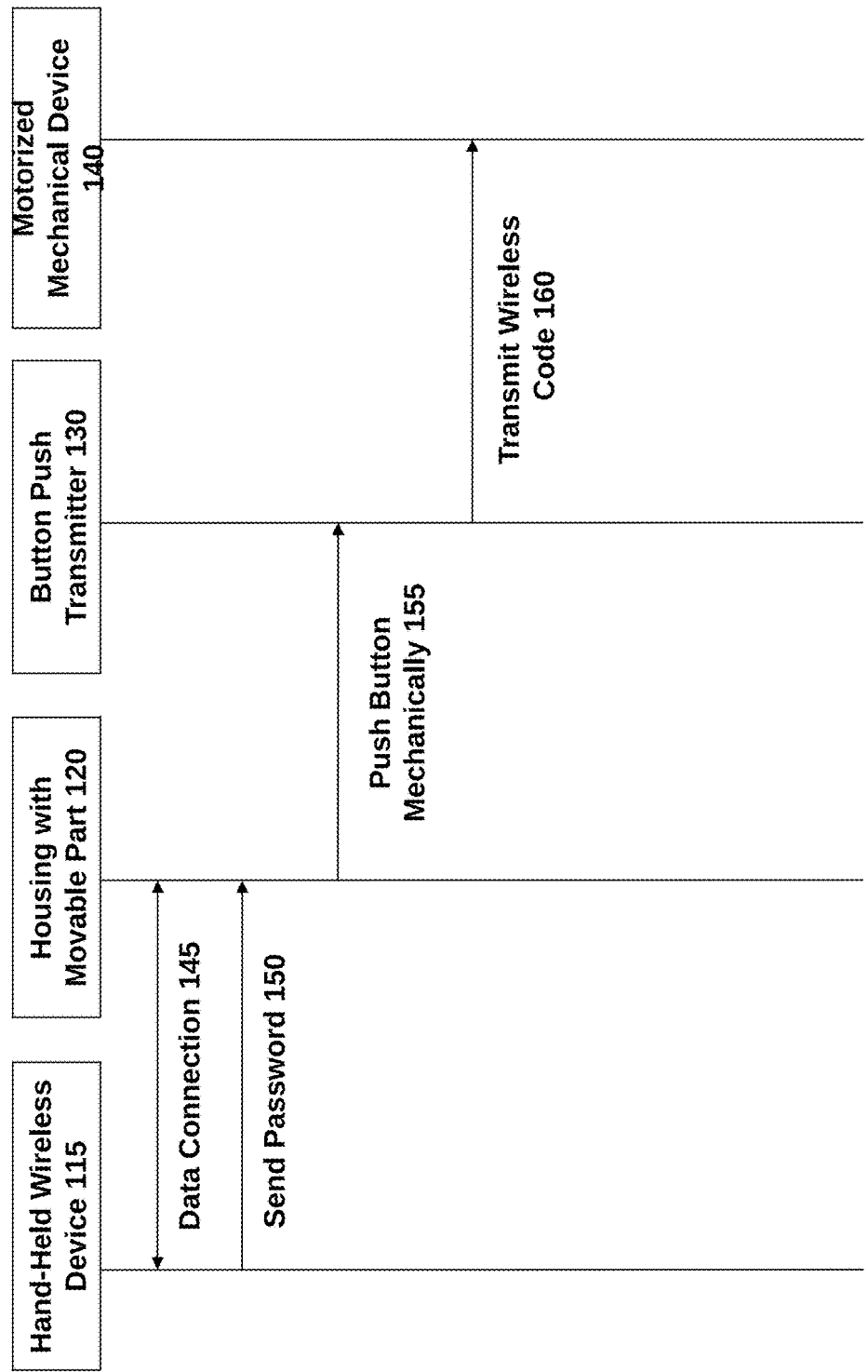
FIG. 1 shows a diagram of a device and steps used to carry out embodiments of the disclosed technology with a hand-held wireless device.

FIG. 1 shows a diagram of a device and steps used to carry out embodiments of the disclosed technology with a hand-held wireless device. A hand-held wireless device 115 is defined as one which has at least a packet-switched data network connection with a server via a radio or invisible light connection. The device is further one which has a display, is powered by a battery, and is designed for, and does function continuously while being transported from place to place. The housing with movable part 120 is a physical box or other physical object which has a holder or attachment mechanism attaching or holding a button push transmitter 130 there-in. The movable part of the housing is a physical device which moves to depress a button on the push button transmitter. The movable part can be a flange, plank, pointed tip, elongated flat slide, or the like, which pushes down onto the button directly or via pressure applied to a device situated on the button.

In step 145, a data connection (packet-switched and wireless) is created between the hand-held wireless device 115 and the housing with movable part 120. A password is then sent, in step 150, from the hand-held wireless device 115, via the data connection, to the housing with a movable part 120. This password or code is used to authenticate that the housing with a movable part 120 should act on the button of the button push transmitter 130. This is a physical button of the button push transmitter 130 that needs to be pushed to be activated, and can, for example, be on a key or key ring provided by a manufacturer of a car. Or the button push transmitter can be a button on a garage door opener or even a television remote control. The password or code can also be as part of an authentication of the data connection itself, such as part of a Bluetooth handshake and connection between the devices 115 and 120 or wireless encryption password.

Once the housing with the movable part 120 receives, via its electrical circuitry, including a processor, the data connection 145 and password 150, a mechanical button is physically pressed down in step 155. The button pressed is on the button push transmitter 130, causing the device 130 to transmit a code wirelessly in step 160 to a motorized mechanical device 140. The motorized mechanical device 140 is defined as a device which physically moves, based on receipt of a specific encoded wireless transmission from a button push transmitter. Examples include a garage door which opens, based on receipt of an infrared or radio transmission from a garage door opener. Another example is a car door with a mechanical lock, where a latch is the mechanical device which moves to unlock the car door. As such, the system works by having a data transmission (step 145 and/or 150), followed by a mechanical transmission (step 155), followed by a further data transmission (step 160), which finally created another mechanical transmission (movement of the motorized mechanical device 140).

Figure 2:
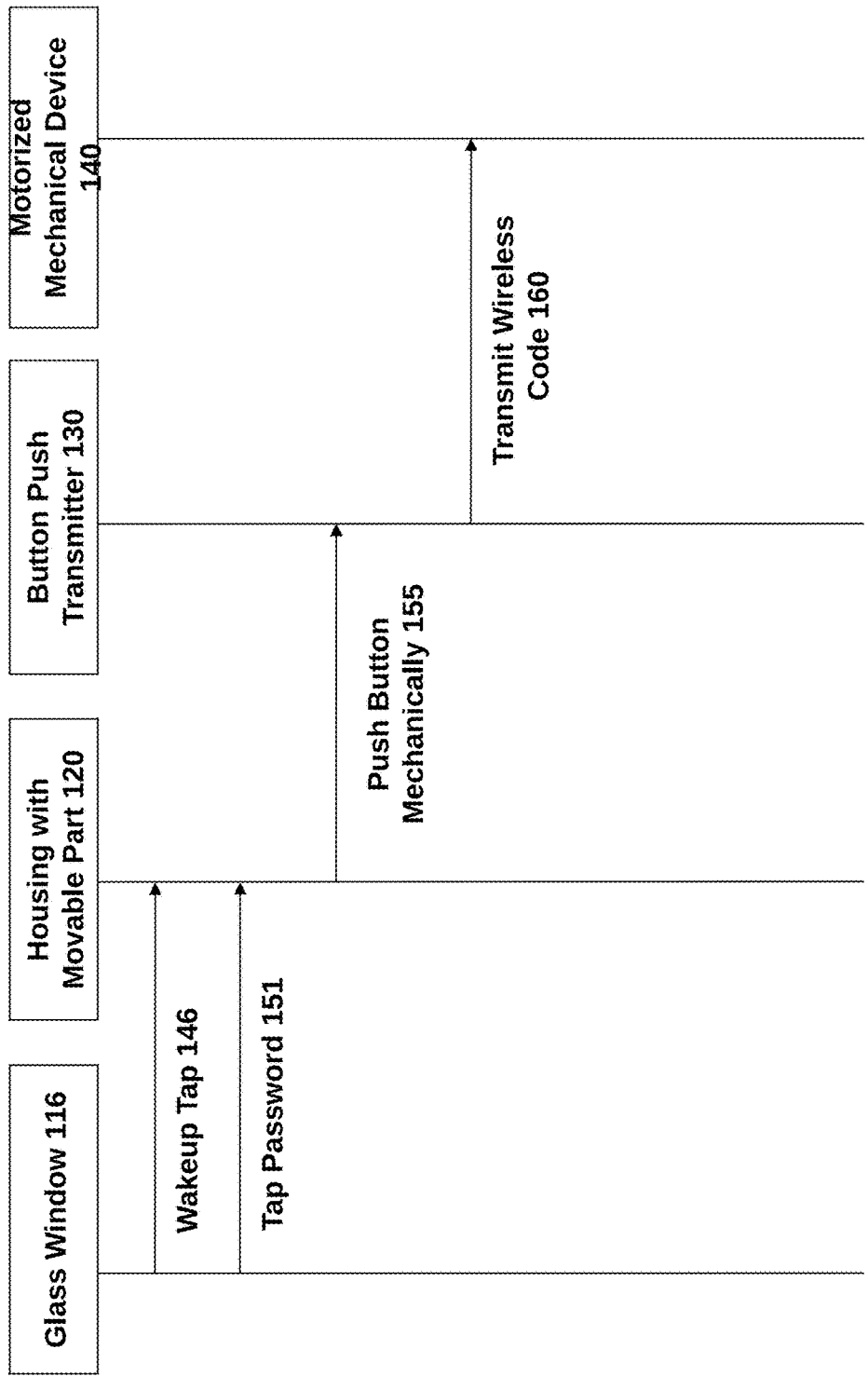
FIG. 2 shows a diagram of a device and steps used to carry out embodiments of the disclosed technology with a vibration sensor.

FIG. 2 shows a diagram of a device and steps used to carry out embodiments of the disclosed technology with a vibration sensor. Here, steps and devices 120, 130, 140, 155, and 160 remain identical to what was described with reference to FIG. 1. However, in FIG. 2, the wireless transmission is transmission via vibration. The vibration can be caused by a finger or hand. This can be done on the housing with movable part 120 directly, such as on its top side, where a vibration sensor (a device which converts vibrations into electrical impulses) resides, or on another device through which the vibration is sensed by the vibration sensor of the housing with movable part 120.

In the embodiment shown in FIG. 1, a glass window 116, such as a window of a car or vehicle is placed on the outside of a housing with movable part 120 (or, conversely, the housing is placed on or stuck to an inside of a car window 116). One can tap the glass window to wake up the device in step 146, or go directly to taping the password in step 151. This is through the glass window 116 onto the housing with movable part 120. This will be described in more detail with respect to FIG. 7. Once the password is correctly entered, steps 155 and 160 proceed as described with reference to FIG. 1.

Figure 3:
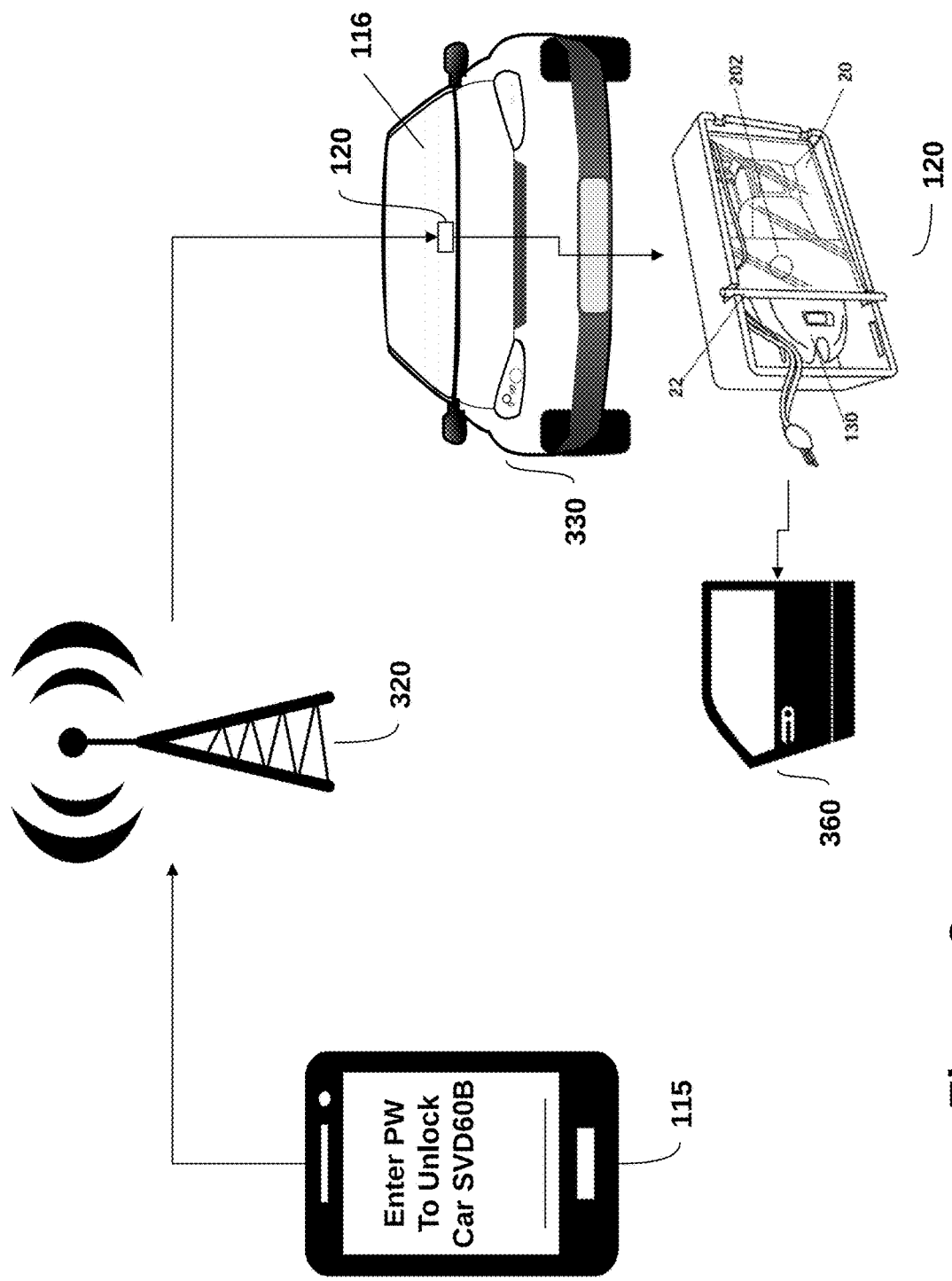
FIG. 3 shows devices used to carry out embodiments of the disclosed technology, using two wireless transmitters.

FIG. 3 shows devices used to carry out embodiments of the disclosed technology, using two wireless transmitters. Here, a hand-held wireless transmitter device 115 is shown, which has network connectivity via a packet-switched data network 320 (such as a cellular telephone/data network through multiple routers and/or switches, or via direct data connection (transmission and receipt) with the housing device 120). On the hand-held wireless transmitter 115, a person is prompted to enter a password to unlock a car with license place SVD60B. The password, once entered, can be transmitted via the data network 320 (or directly) to the housing 120. The housing 120 has, in such an embodiment, an antenna and circuitry for receiving data transmitted to it and verifying correct entry of a password. As shown, the housing 120 can be, for example, on the underside of a windshield 116 of a vehicle 330. Upon receipt by circuitry within the housing 120 of the password or code to activate, a mechanical device, such as a plate 20, attached to the housing at least by rod 22, depresses a mechanical button (under ball 202) of the wireless transmitter 130. This causes to occur whatever the wireless transmitter 130 is programmed to do. In the example shown in FIG. 3, the wireless transmitter opens a lock of a car door 360.

Figure 4:
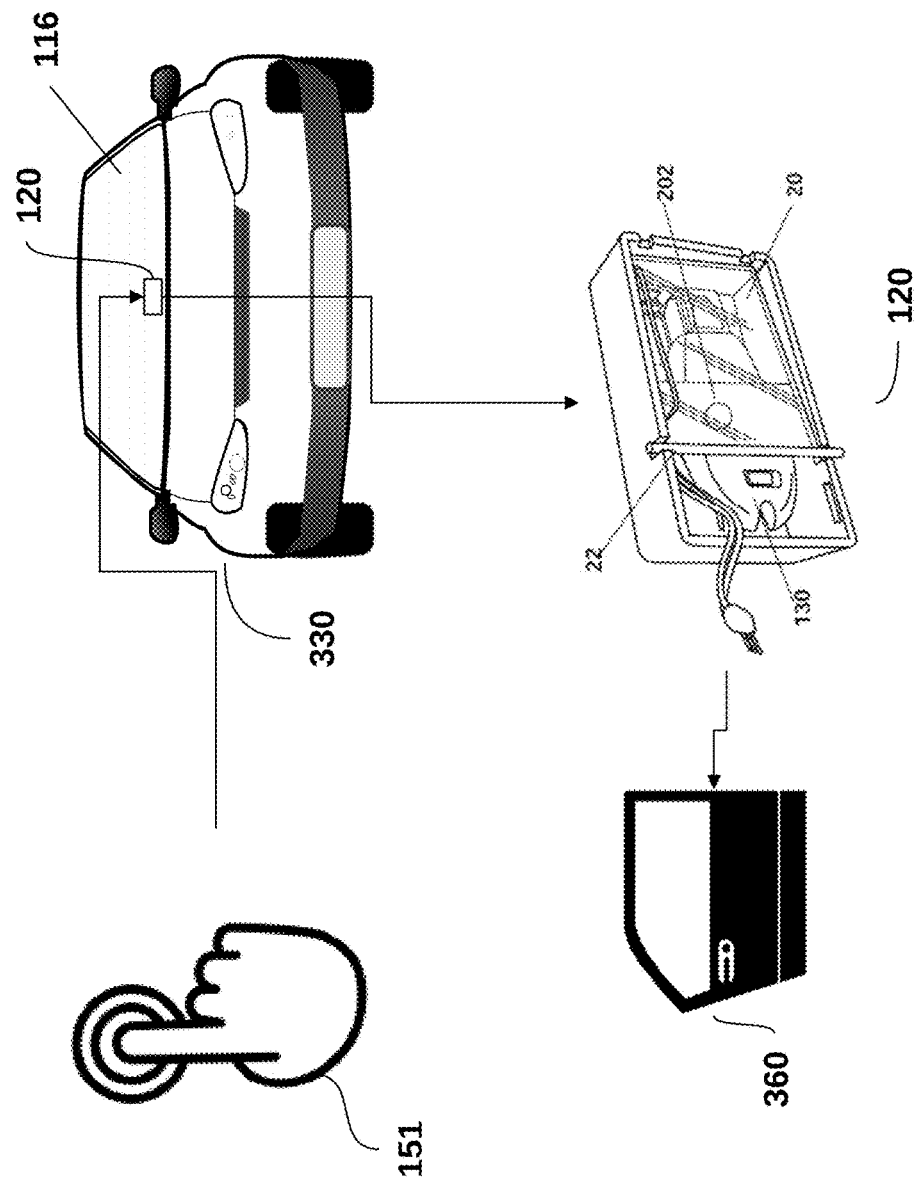
FIG. 4 shows devices used to carry out embodiments of the disclosed technology, using tapping and vibration.

FIG. 4 shows devices used to carry out embodiments of the disclosed technology using tapping and vibration. Here, one taps a password 151 on a windshield 116, or other window, or other place on the exterior of the vehicle 330. The housing 120 has a vibration sensor there-in (such as a rod 22) which detects the vibration and decodes same. Based on a correctly tapped password, a button is pressed on the transmitter 130, unlocking a car door 360, or otherwise causing mechanical movement.

Figure 5:
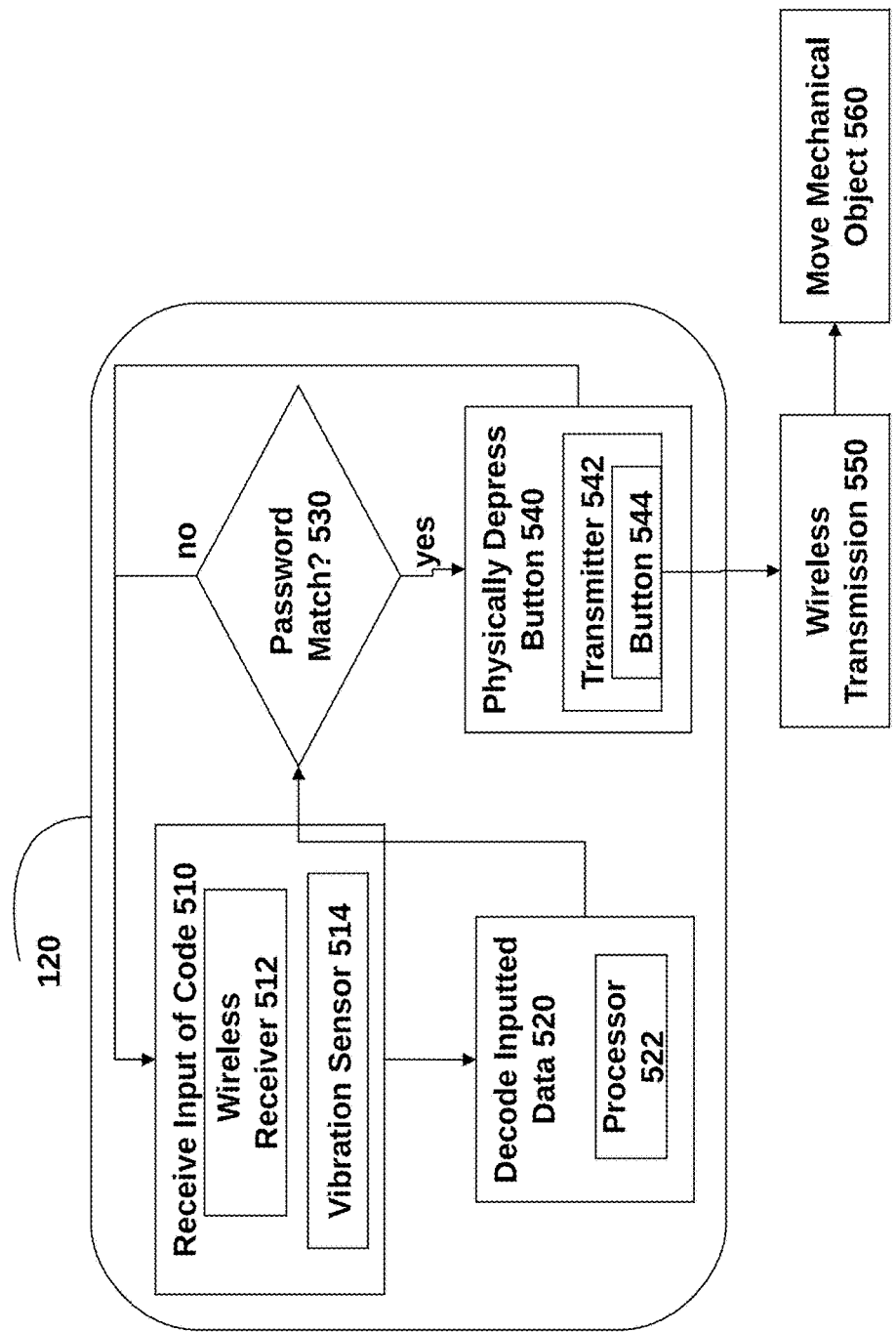
FIG. 5 shows a high level method of carrying out embodiments of the disclosed technology.

FIG. 5 shows a high level method of carrying out embodiments of the disclosed technology. In step 510 input of a code is received. This code or password is received wirelessly via a wireless receiver 512 and/or a vibration sensor 514. The inputted data is decoded in step 520, such as on a processor 522 which receives and sends instructions as well as carries out computations. When there is no password match in step 530, then the system simply waits for a further input, and step 510 can eventually be carried out again. If there is a password match, then a button 544 on a transmitter 542 is physically depressed in step 540. All of the steps/devices 510 through 540 are within, or carried out within, the housing 120. Once the button is pressed in step 540, this causes an electrical wireless transmission via radio or invisible light (e.g., infrared) in step 550. This wireless transmission is received by a receiver electrically connected, or coupled, to a movable mechanical object, and the movable mechanical object is moved in step 560.

Figure 6:
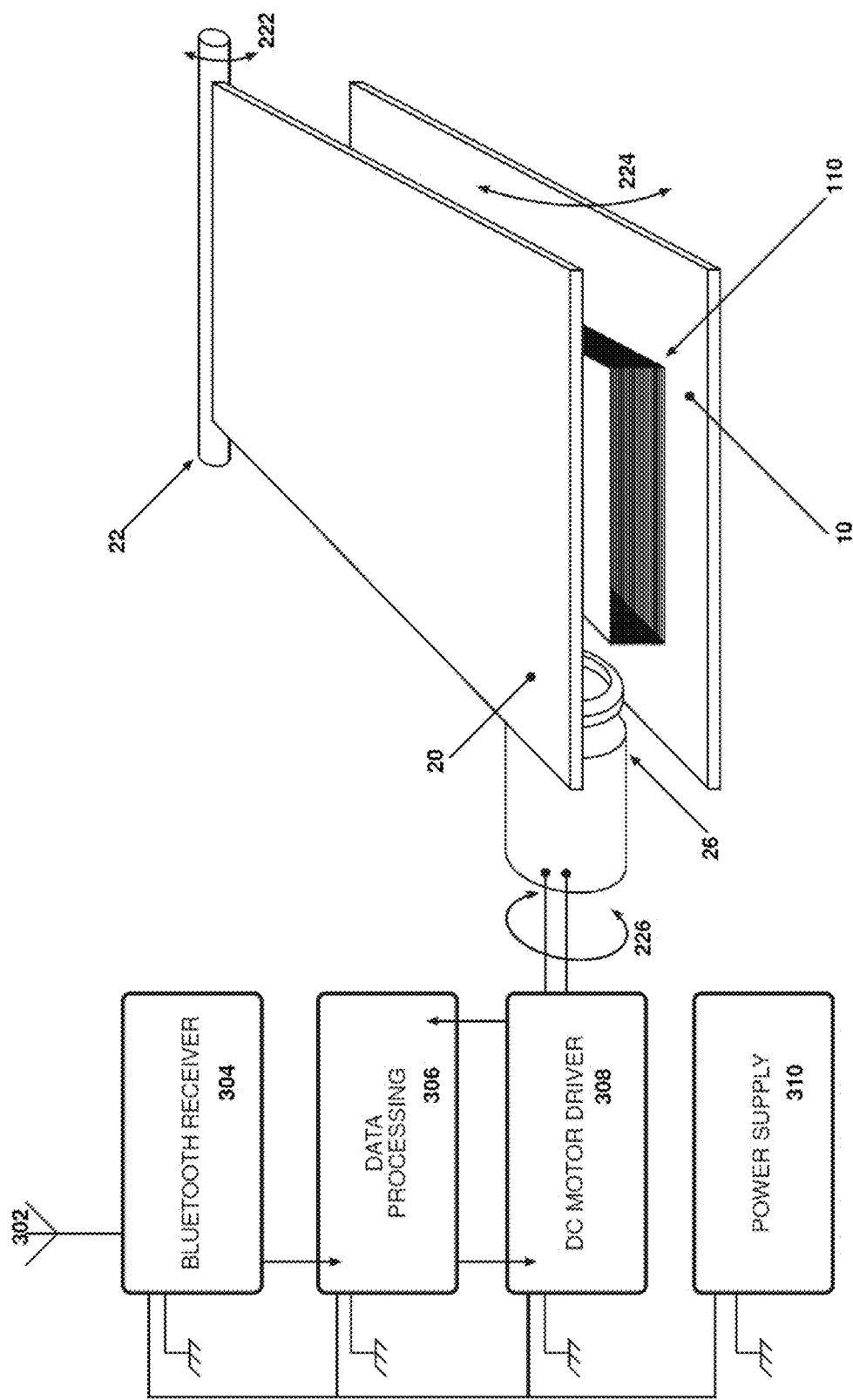
FIG. 6 shows component parts of a housing used to carry out embodiments of the disclosed technology.

FIG. 6 shows plates and accompanying control units used to depress a button of a transmitter, in an embodiment of the disclosed technology. Here, a BlueTooth receiver 304 or any other wireless receiver can be used to receive a signal via antenna 302. A processor, input/output, memory storage (volatile or non-volatile) is represented by the data-processing block 306. A power supply 310 powers the processor, receiver, and/or motor 26. Data is received from one or more inputs, such as a remote device transmitting a code or a sensor detecting movement or key presses on a surface of the device (see FIG. 7). The data processing block 306 determines when to operate the DC motor driver 308 to turn the shaft of the motor 26 in the direction indicated by arrow 226. This circular motion of the motor shaft, in turn, raises and lowers the movable plate 20 in the direction 224. The plate 10, which can also be the back of the housing 10 shown in earlier figures, is held in place with respect to the transmitter device 110 shown there-on, as well as the motor 26. The plate 20 rises, also spinning the dowel 22 in the direction 222. The plate 20 starts in a resting position above the transmitter 110 and the resilient ball adjacent there-to. The plate 20 is then lowered until it presses into the resilient ball 200 and, in turn, a button on the transmitter 110 is pressed.

Figure 7:
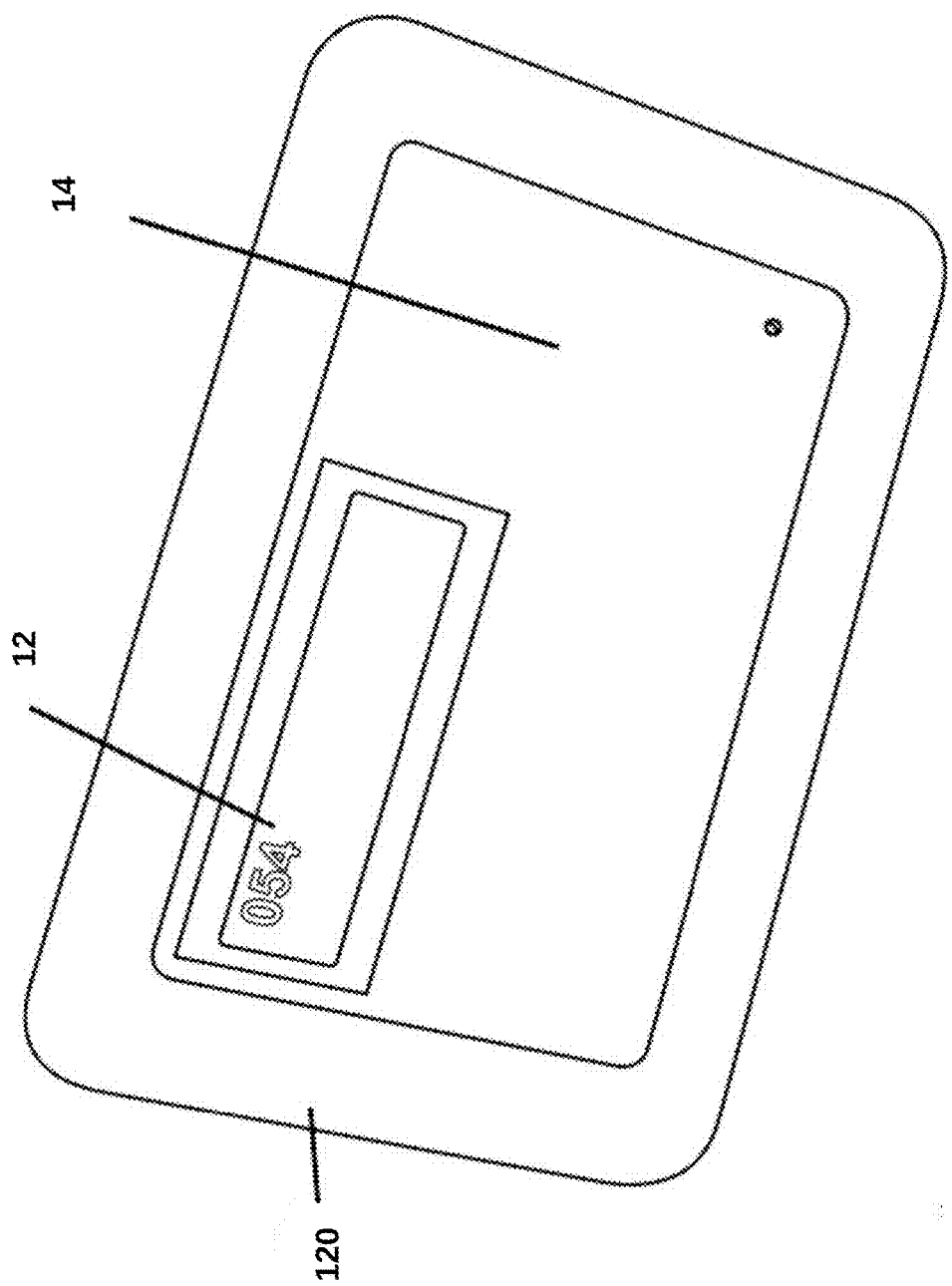
FIG. 7 shows a front face of a housing which can be used to carry out embodiments of the disclosed technology.

FIG. 7 shows a front face of a housing which can be used to carry out embodiments of the disclosed technology. A cover or front panel 14 of the housing 120 can have a display 12. The cover 14 can further have sensors which sense touch or vibration. A code, pattern, or password is made there-on to cause the button to be pressed by the downward movement. The display 12 can update as the code or pattern is entered, to show the present status of the code entered. For example, one can tap on the front panel (or through a window or other device, so long as the vibration or tap is felt/sensed on the front panel) with taps on, or felt strongest on, the left half of the panel causing a number to decrease, while corresponding such taps on the right half cause a number to increase. In this manner a code can be entered. Alternatively, when receiving the code via wireless data transmission, such a code can be displayed on the display 12 as it is received.

Figure 8:
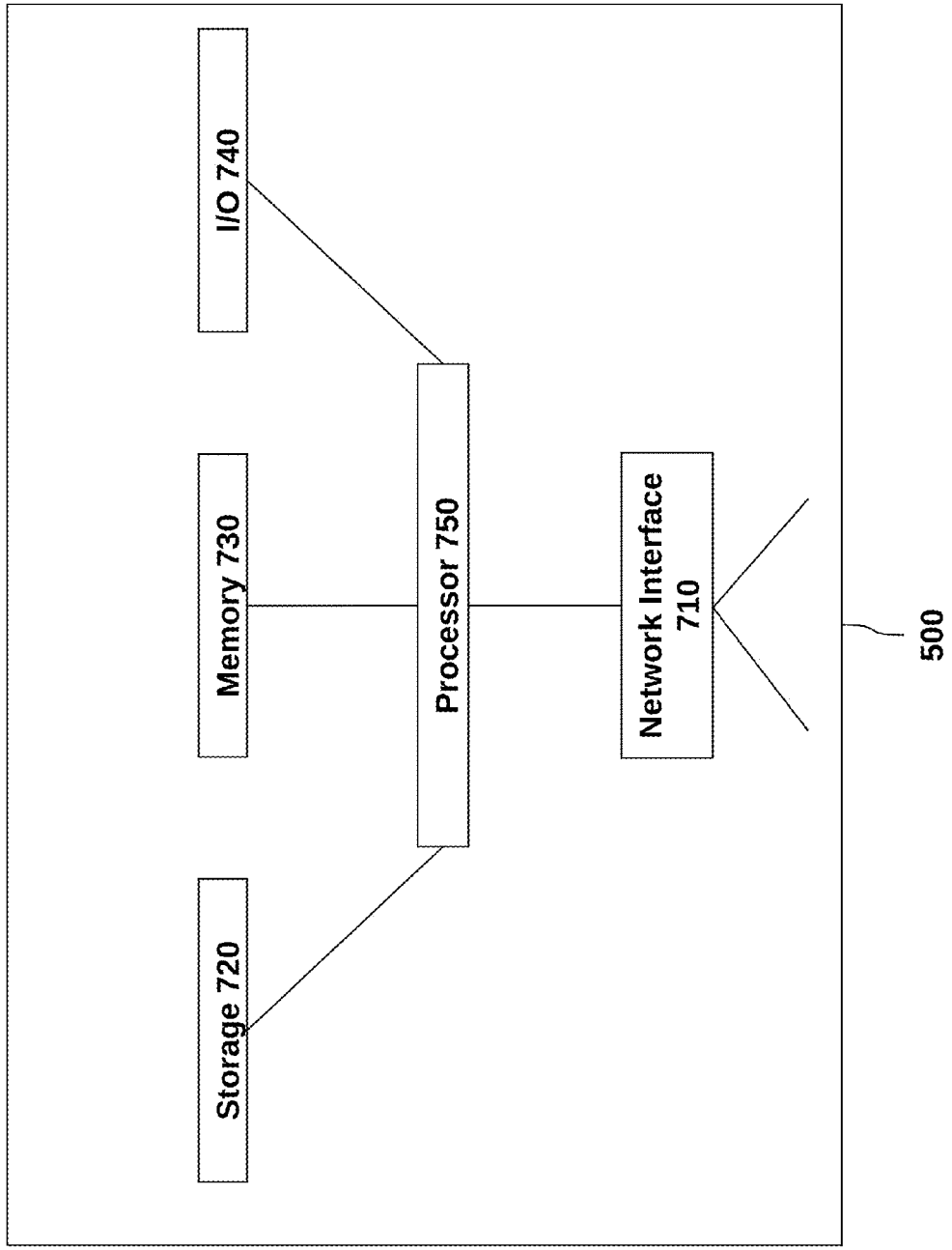
FIG. 8 shows high level devices which can be used to carry out embodiments of the disclosed technology.

FIG. 8 shows high level devices which can be used to carry out embodiments of the disclosed technology. Device 800 comprises a processor 850 that controls the overall operation of the computer by executing the device's program instructions which define such operation. The device's program instructions may be stored in a storage device 820 (e.g., magnetic disk, database) and loaded into memory 830, when execution of the console's program instructions is desired. Thus, the device's operation will be defined by the device's program instructions stored in memory 830 and/or storage 520, and the console will be controlled by processor 850 executing the console's program instructions. A device 800 also includes one, or a plurality of, input network interfaces for communicating with other devices via a network (e.g., the internet). The device 800 further includes an electrical input interface. A device 800 also includes one or more output network interfaces 810 for communicating with other devices. Device 800 also includes input/output 840, representing devices which allow for user interaction with a computer (e.g., display, keyboard, mouse, speakers, buttons, etc.). One skilled in the art will recognize that an implementation of an actual device will contain other components as well, and that FIG. 8 is a high level representation of some of the components of such a device for illustrative purposes. It should also be understood by one skilled in the art that the method and devices depicted in FIGS. 1 through 7 may be implemented on a device such as is shown in FIG. 8.

Figure 9:
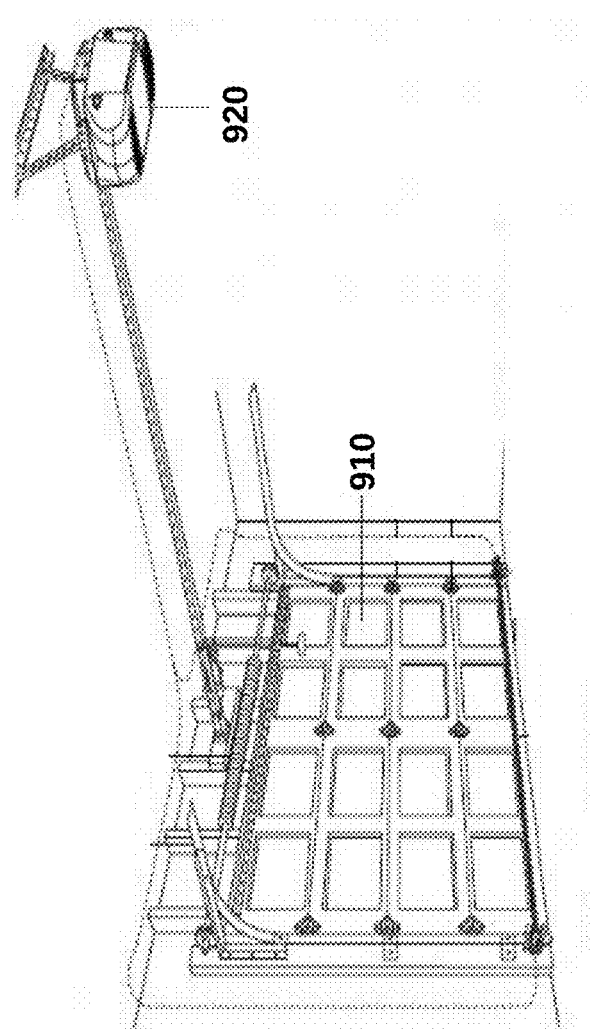
FIG. 9 shows a garage door and garage door opener used to carry out embodiments of the disclosed technology.
Figure 9:
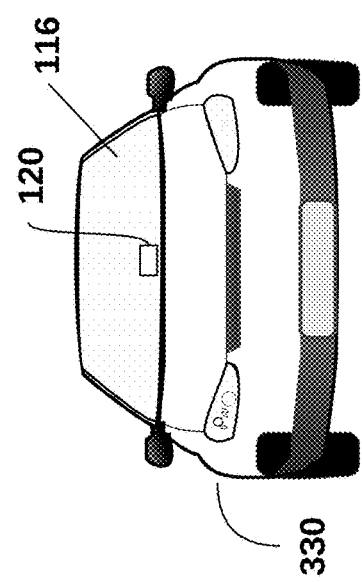

FIG. 9 shows a garage door and garage door opener used to carry out embodiments of the disclosed technology. The housing with movable part 120 is shown in the car 330 from FIGS. 3 and 4. The remote control (such as a remote controller 130 shown in FIG. 3) within the housing 120 transmits a signal which is received by a garage door opener 920 on the other side of a garage door 910, in an embodiment of the disclosed technology. In this manner, the device from the manufacturer, such as a remote control which is designed to operate with a specific other device, such as a garage door opener, moves yet a different mechanical device, such as a garage door. This is carried out by way of a separate and distinct wireless communication (one which is electrical or physical) of a specific code which results in a mechanical press of button on the remote control.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method of operating a mechanically moving device, comprising the steps of:
    sending an encoded wireless transmission to a housing holding a remote control designed to operate said mechanically moving device;
    causing a processor within said housing to decode said encoded wireless transmission;
    wherein upon said wireless transmission being decoded, a device moves within said housing, causing depression of a button on said device, wherein said depressing of said button is carried out by activating a motor so that a shaft of the motor, associated with a moveable plate drives lowering of said movable plate until it presses into a resilient ball adjacent said button, which resilient ball effects depressing of said button, wherein raising of said movable plate by said motor causes spinning of a dowel functionally associated with said movable plate;
    wherein said housing is fixed in position with respect to said button;
    wherein said encoded wireless transmission comprises one of a plurality of pre-designated patterns or codes, each operative to cause said movable plate to engage said button;
    wherein said remote control transmits a second wireless signal, causing said mechanically moving device to move.

2. The method of claim 1, wherein said remote control is designed to independently control said mechanically moving device by way of a push of said button on said remote control, and said housing acts to push said button.

3. The method of claim 1, wherein said wireless transmission is transmission of a password by way of a short-range wireless connection between a wireless transmission device and said housing.

4. The method of claim 1, wherein said wireless transmission is transmission of a password by way of a packet-switched data network connection of a password to said housing.

5. The method of claim 1, wherein said wireless transmission is in the form of a physical vibration of said housing decoded by said decoder.

6. A kit comprising:
    a mechanical locking device;
    a remote control with mechanical button, said mechanical button operative to open said mechanical locking device by way of wireless transmission;
    a housing holding said remote control, said housing having a motorized movable device there-within, said motorized movable device including a mechanical movable plate disposed above a resilient ball functionally associated with said mechanical button;
    wherein said housing is fixed in position with respect to said mechanical button;
    wherein said housing further comprises an input and decoder decoding said input,
    wherein said kit further comprises a handheld wireless transceiver connecting via radio signal to said input of said housing, such that upon said input matching a pre-designated pattern a motor of said motorized movable device is activated and a shaft of the motor, functionally associated with said mechanical movable plate, lowers said mechanical movable plate to engage said resilient ball thereby depressing said mechanical button of said remote control and unlocking said mechanical locking device, and subsequently raises said mechanical movable plate thereby effecting spinning of a dowel functionally associated with said mechanical movable plate.

7. The kit of claim 6, wherein said input is a vibration sensor, and vibrations of said housing are translated into coded input decoded by said decoder.

8. The kit of claim 7, wherein said housing affixed on an interior side of a window of a vehicle and said vibrations are exerted on an exterior side of said window.

9. A method of initiating a wireless transmission causing a mechanical movement, which causes a further wireless transmission for purposes of causing a second mechanical movement, comprising the steps of:
    initiating a first wireless transmission from a hand-held wireless device having a network connection with a wireless transmitter housing a motor including a motor shaft, functionally associated with a mechanically movable plate disposed above a resilient ball and a mechanical button, said mechanically movable plate also functionally associated with a dowel;
    wherein said device housing said mechanically movable plate is fixed in position with respect to said mechanical button;
    activating said motor so that said motor shaft effects lowering of said mechanically movable plate to engage said resilient ball thereby to depress said mechanical button of said wireless transmitter, based on said first wireless transmission;
    wherein said first wireless transmission transmits one of a plurality of pre-designated patterns or codes, each operative to cause said mechanically movable plate to engage said mechanical button;
    said wireless transmitter, sending a second wireless transmission, based on said engaging of said mechanical button;
    a second mechanical device, distinct from said wireless transmitter and said handheld wireless device, moving as a result of said first and second wireless transmission, as well as a result of said engaging of said mechanical button.

10. The method of claim 9, wherein said moving of said second mechanical device is in the form of unlocking based on a code sent by said first wireless device.

11. The method of claim 9, wherein said device housing said mechanically movable plate is fixed to an interior of a vehicle.

12. The method of claim 9, wherein said mechanical button is on a mechanical key which operates a mechanical lock of said vehicle.

13. The method of claim 9, further comprising, following said lowering, activating said motor so that said motor shaft effects raising of said mechanically movable plate from said resilient ball which in turn effects spinning of said dowel.

* * * * *